United States Patent [19]

Butler

[11] Patent Number: 5,998,510

[45] Date of Patent: *Dec. 7, 1999

[54] LOW PRESSURE SHEET MOLDING COMPOUNDS

[75] Inventor: Kurt Ira Butler, Kingsville, Ohio

[73] Assignee: Premix, Inc., North Kingsville, Ohio

[ * ] Notice: This patent is subject to a terminal disclaimer.

[21] Appl. No.: 09/016,822

[22] Filed: Jan. 30, 1998

Related U.S. Application Data

[63] Continuation of application No. 08/707,752, Sep. 4, 1996, Pat. No. 5,744,816.

[51] Int. Cl.$^6$ .............................. C08L 63/10; C08L 67/06; C08L 75/06

[52] U.S. Cl. ........................ 523/456; 523/457; 523/459; 523/510; 523/514; 523/516; 525/25; 525/28; 525/528; 525/531

[58] Field of Search ................................ 525/25, 28, 528, 525/531; 523/456, 457, 459, 510, 514, 516

[56] References Cited

U.S. PATENT DOCUMENTS

| | | | |
|---|---|---|---|
| 3,873,640 | 3/1975 | Owston | 525/126 |
| 4,272,619 | 6/1981 | Balle | 521/169 |
| 4,578,426 | 3/1986 | Lenz | 525/131 |
| 5,159,044 | 10/1992 | Bogner | 525/25 |
| 5,498,670 | 3/1996 | Aoyama | 525/217 |
| 5,504,151 | 4/1996 | Fisher | 525/49 |
| 5,508,315 | 4/1996 | Mushovic | 521/122 |
| 5,521,232 | 5/1996 | Gynn | 525/513 |

FOREIGN PATENT DOCUMENTS

| | | |
|---|---|---|
| 54-057532 | 5/1979 | Japan . |
| 04046919 | 2/1992 | Japan . |

*Primary Examiner*—Patricia A. Short
*Attorney, Agent, or Firm*—Renner, Otto, Boisselle & Sklar

[57] ABSTRACT

This invention relates to low pressure sheet molding compounds and, more particularly, to a composition that is moldable at pressures below about 100 psi, said composition being made by combining: (A) an unsaturated prepolymer resin; (B) a monomeric unsaturated polymerizable material containing a terminal ethylene group; (C) a hydroxy-terminated polyester having a molecular weight in the range of about 500 to about 3000; (D) a polyisocyanate; and (E) a polymerization initiator; the mole ratio of NCO groups from (D) to OH groups from (C) being in the range of about 0.1 to about 10.

19 Claims, 8 Drawing Sheets

5,998,510

LOW PRESSURE SHEET MOLDING COMPOUNDS

This is a continuation, of application Ser. No. 08/707,752, filed Sep. 4, 1996, now U.S. Pat. No. 5,744,816.

TECHNICAL FIELD

This invention relates to low pressure sheet molding compounds. More particularly, this invention relates to compositions that are moldable at pressures below about 100 psi.

BACKGROUND OF THE INVENTION

For years it was generally believed that high pressures of about 1000 psi were needed for molding thermoset sheet molding compounds in order to achieve proper flow. The use of such high pressures, however, was costly, requiring heavy duty presses and expensive forged steel tooling.

W. H. Englehart in "The First Successful Low Pressure SMC (SMC II) Application for a Class 'A' Part," 33rd Annual Technical Conference, 1978, The Society of Plastics Industry, Inc. reported that SMC II, which was a low viscosity sheet molding compound marketed by Owens-Corning Fiberglas, could be used to mold a part having a class A surface at 500 psi. Since then low pressure sheet molding operations have been developed that operate at pressures as low as 200–300 psi.

Nevertheless, there is a continuing need for sheet molding compounds that can be molded at pressures below 100 psi, particularly with respect to unsaturated prepolymer/polyurethane sheet molding compounds such as polyester/polyurethane sheet molding compounds. The use of such low pressures would provide significant cost reductions in tooling requirements for molders. For example, the use of heavy duty presses could be avoided. Also, cast steel tooling rather than the more costly forged steel tooling could be used.

While the need for such low pressure sheet molding compounds has been clear, the solution to the problem of providing such compounds has not been clear. The present invention, however, provides such a solution.

SUMMARY OF THE INVENTION

This invention relates to low pressure sheet molding compounds and, more particularly, to a composition that is moldable at pressures below about 100 psi, said composition being made by combining: (A) an unsaturated prepolymer resin; (B) a monomeric unsaturated polymerizable material containing a terminal ethylene group; (C) a hydroxy-terminated polyester having a molecular weight in the range of about 500 to about 3000; (D) a polyisocyanate; and (E) a polymerization initiator; the mole ratio of NCO groups from (D) to OH groups from (C) being in the range of about 0.1 to about 10.

DESCRIPTION OF THE PREFERRED EMBODIMENTS

Figure 1:
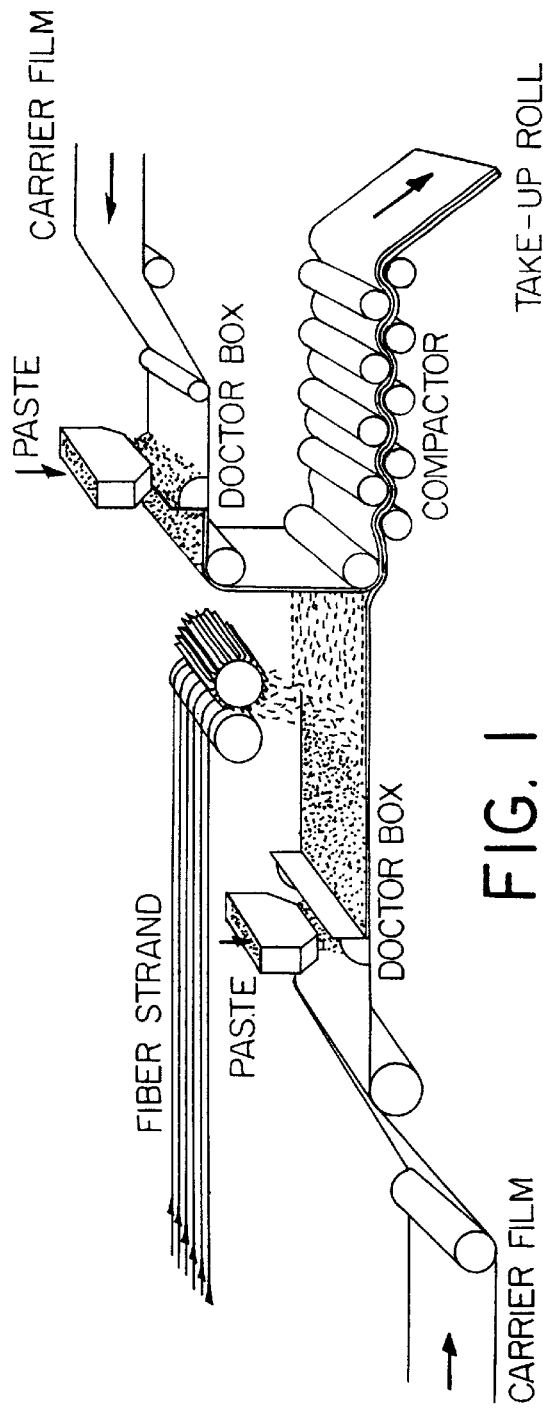
FIG. 1 is a schematic representation of a sheet molding compound (SMC) machine for making the inventive sheet molding compounds.

The unsaturated prepolymer resins (A) which are useful with the present invention are well known in the art. These include unsaturated polyester resins and vinyl ester resins.

The unsaturated polyesters are condensation polymers derived by the condensation of unsaturated polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are not subject to cross-linking. The particular non-cross-linking components and their properties will depend upon the desired properties of the final products.

Examples of unsaturated polybasic acids or anhydrides which are utilized in the formation of the polyester resins include maleic acid, fumaric acid, itaconic acid, tetrahydrophthalic acid, or the anhydrides of any of the foregoing. Examples of saturated aliphatic polycarboxylic acids include adipic and succinic acids, and examples of aromatic dicarboxylic acids include phthalic acid, isophthalic acid, terephthalic acid and halogenated derivatives such as tetrachlorophthalic acid and anhydride.

Examples of polyols include dihydroxy and trihydroxy compounds which in turn include ethylene glycol, propylene glycol, 1,2-butanediol, 1,3-butanediol, 1,4-butanediol, diethylene glycol, dipropylene glycol, glycerol, neopentyl glycol, and reaction products of alkylene oxides with, for example, 2,2'-bis(4-hydroxyphenylene)propane (a Bisphenol A).

The polyesters are prepared by reacting the one or more polybasic acids or anhydrides with the polyols (di- or tri-hydroxy compounds) in approximately equal proportions. Examples of such polyesters include: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). The degree of polymerization of polyester resins is conveniently measured with respect to the acid end groups. One gram of the polyester resin is titrated with potassium hydroxide, and the number of milligrams of potassium hydroxide necessary to neutralize the gram of polyester is called the acid number. In one embodiment of this invention, the acid number of the polyester resin is from zero to about 5, and in one embodiment about 2 to about 4. A wide variety of polyester resins that can be used are commercially available.

The vinyl ester resins that can be used are the reaction products of epoxy resins and a monofunctional ethylenically unsaturated carboxylic acids. They may be represented by the formula

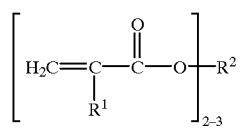

where $R^1$ is H or $CH_3$, and $R^2$ is an epoxy resin, examples of the latter including epoxylated bisphenol A-epichlorohydrin and epoxylated phenol-formaldehyde novolac. These resins can be made by reacting an epoxy resin with an ethylenically unsaturated carboxylic acid. The epoxy resins that can be used include diglycidyl ether of bisphenol A and higher homologues thereof, the diglycidyl ether of tetrabromobisphenol A, epoxylated phenol-formaldehyde novolac, and polypropylene oxide diepoxide. The acids that can be used include acrylic and methacrylic acid. The acid-epoxide reaction can be catalyzed by tertiary amines, phosphines, alkalis, or onium salts.

The concentration of the unsaturated prepolymer (A) in the inventive composition is, in one embodiment, about 5% to about 60% by weight based on the total weight of the inventive composition. In one embodiment, the concentration of (A) is about 10% to about 50%, and in one embodiment about 15% to about 40%, and in one embodiment about 20% to about 30% by weight based on the total weight of the inventive composition.

The monomeric unsaturated polymerizable material (B) is characterized by a terminal ethylene group. In one embodiment, the terminal ethylene group is attached to an electronegative group such as the phenyl group as in styrene, halogen as in vinyl chloride, an acetoxy group as in vinyl acetate or a carbethoxy group as in ethyl acrylate. Examples of such compounds include styrene, alpha-methyl styrene, chloro styrene, vinyl toluene, divinyl benzene, diallylphthalate, methyl methacrylate, and mixtures of two or more thereof. The concentration of the unsaturated monomer (B) in the inventive composition is, in one embodiment, about 1% to about 70% by weight based on the total weight of the inventive composition. In one embodiment, the concentration of (B) is about 3% to about 50%, and in one embodiment about 5% to about 40%, and in one embodiment about 10% to about 20% by weight based on the total weight of the inventive composition.

The particular monomeric unsaturated polymerizable material (B) selected for use in the inventive composition is, in one embodiment, a material that is capable of dissolving the prepolymer (A) at room temperature. Thus, in one embodiment, the prepolymer (A) is dissolved in the monomer (B) prior to being combined with the remaining components of the inventive composition. The amount of unsaturated monomer (B) that can be used is, in one embodiment, from about 10% to about 60% and, in one embodiment, from about 30% to about 50% by weight of the mixture of monomer (B) and a prepolymer (A). Alternatively, the mixture of prepolymer (A) and monomer (B) contains from about 3 to 7 parts by weight of the monomer (B) for each 10 parts of prepolymer (A).

An example of an unsaturated prepolymer (A)/monomer (B) solution that can be used is available from Reichhold Chemicals under Product Code 7568-44-3; this material is an amber liquid having a specific gravity of 1.1 that is identified by the manufacturer as having an unsaturated polyester resin content of about 60% by weight and a styrene monomer content of about 35% by weight. Other examples include an unsaturated polyester resin based on propylene glycol and maleic anhydride and styrene monomer (31–36% monomer) mixture having a specific gravity of 1.1 from Reichhold Chemicals under Product Code 31615-20; and a mixture of styrene monomer (26–32% by weight) and polyester resin from Owens-Corning Fiberglas as product E-903. These compounds can be used alone or in combination. Preferably, a combination is used.

The hydroxy-terminated polyesters (C) are similar to the unsaturated polyesters (A) except that the polyesters (C) can be saturated or unsaturated and are hydroxy-terminated. They are prepared by reacting together a polycarboxylic acid or anhydride, such as dicarboxylic acid or anhydride, and a polyol, such as a dihydroxy compound, in proportions such that the mole ratio of the polyol to the polycarboxylic acid or anhydride is controlled to insure that the polyester chain terminates in a hydroxyl group at each end. The polycarboxylic acids and anhydrides and the polyols that are identified above for making the unsaturated polyesters (A) are also useful for making these hydroxy-terminated polyesters. The hydroxy-terminated polyesters (C) may be prepared by conventional techniques wherein a mixture of the acid or anhydride and the polyol is heated at temperatures in the range of about 100° C. to about 200° C. and, if necessary, in a subatmospheric pressure for the removal of by-product water. This reaction can be carried out neat or in a compatible non-reactive solvent. The hydroxy-terminated polyesters (C) have molecular weights in the range of about 500 to about 3000, and in one embodiment about 600 to about 2800, and in one embodiment about 650 to about 2600. They have hydroxyl functionalities in the range of 2 to about 4, and in one embodiment 2 to about 3. They have OH numbers in the range of about 40 to about 170, and in one embodiment about 50 to about 90. The OH number is the number of milligrams of KOH needed to neutralize one gram of the hydroxy-terminated polyester.

Examples of commercially available hydroxy-terminated polyesters (C) that can be used include the following polyesters available from Bayer under the trade name Desmophen:

| Polyester | Percent Weight Solids | Viscosity MPa's | Molecular Weight | Equivalent Weight | OH Content % | OH Number | Functionality |
|---|---|---|---|---|---|---|---|
| Desmophen 1652 | 100 | 9000–13000 (23° C.) | 2004 | 1002 | 1.7 | 56 | 2 |
| Desmophen 1700 | 99–100 | 15000 (20° C.) | 2550 | 1275 | 1.3 | 44 | 2 |
| Desmophen 1800 | 100 | 26000 (20° C.) | 2520 | 935 | 1.8 | 60 | 2.7 |
| Desmophen R-12A | 100 | 17700 (20° C.) | 1180 | 337 | 5.0 | 166.5 | 3–4 |

Desmophen 1652 is identified by the manufacturer as being a diethylene adipate containing a minor amount of butane diol. Desmophen 1700 is identified as a diethylene adipate diol. Desmophen 1800 is identified as a diethylene adipate diol-triol. Desmophen R-12A is identified as a modified adipate polyol.

The concentration of the hydroxy-terminated polyester (C) in the inventive composition is, in one embodiment, about 0.5% to about 30% by weight based on the total weight of the inventive composition. In one embodiment, the concentration of (C) is about 1% to about 20%, and in one embodiment about 1% to about 10%, and in one embodiment about 2% to about 8% by weight based on the total weight of the inventive composition.

The polyisocyanate (D) can be saturated, unsaturated, monomeric or polymeric. The only requirements are that the polyisocyanate contain at least two isocyanate groups, and be free of any groups which interfere in the reaction of an isocyanate group with a hydroxyl group. Illustrative examples of polyisocyanates which can be used include: 2,4-toluene diisocyanate; 2,6-toluene diisocyanate; m-phenylene diisocyanate; p-phenylene diisocyanate; 1,5-naphthalene diisocyanate; 4,4'-diphenyl ether diisocyanate; 4,4',4"-triphenylmethane triisocyanate; 2,4,4'-triisocyanatodiphenylmethane; 2,2',4-triisocyanato diphenyl; 4,4'-diphenylmethane diisocyanate; 4,4'-benzophenone diisocyanate; 2,2-bis(4-isocyanatophenyl)propane; 1,4-naphthalene diisocyanate; 4-methoxy- 1,3-phenylene diisocyanate; 4-chloro-1,3-phenylenediisocyanate; 4-bromo-1,3-phenylene diisocyanate; 4-ethoxy-1,3-phenylene diisocyanate; 2,4'-diisocyanatodiphenyl ether; 4,4'-diisocyanatodiphenyl; 9,10-anthracene diisocyanate; 4,6-dimethyl-1,3-phenylene diisocyanate; 4,4'-diisocyanatodibenzyl; 3,3'-dimethyl-4,4'-diisocyanatodiphenylmethane; 3,3'-dimethyl-4,4'-diisocyanatodiphenyl; 3,3'-dimethoxy-4,4'-diisocyanatodiphenyl; 1,8-naphthalene diisocyanate; 2,4,6-toluene triisocyanate; 2,4,4'-triisocyanatodiphenyl ether; diphenylmethane diisocyanate available under the trademarks Mondur and Papi, having a functionality of 2.1 to 2.7; 1,3-xylene 4,6-diisocyanate; aromatic isocyanate-terminated polyurethanes; aromatic isocyanate-terminated prepolymers of polyesters; 1,6-hexamethylene diisocyanate; ethylene diisocyanate; propylene 1,2-diisocyanate; butylene 1,2-diisocyanate; butylene 2,3-diisocyanate; pentamethylene diisocyanate; cyclopentylene 1,3-diisocyanate; cyclohexylene 1,2-diisocyanate; cyclohexylene 1,3-diisocyanate; cyclohexylene 1,4-diisocyanate; 1,10-decamethylene diisocyanate; diisocyanato dicyclohexyl methane; 1,5-diisocyanato-2,2-dimethyl pentane; hydrogenated 4,4'-diphenylmethane diisocyanate; hydrogenated toluene diisocyanate; (OCNCH$_2$CH$_2$)$_2$S; (OCNCH$_2$CH$_2$CH$_2$)$_2$O; OCNCH$_2$CH$_2$CH$_2$CH(OCH$_3$)CH$_2$CH$_2$NCO; OCNCH$_2$CH$_2$CH$_2$O(CH$_2$)$_4$OCH$_2$CH$_2$NCO;

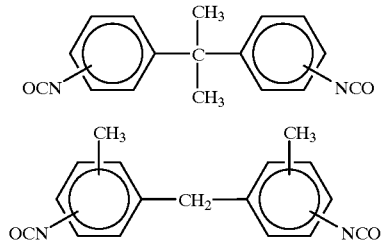

Examples of commercially available polyisocyanates (D) that can be used include Lupranate MP102 (a product of BASF identified as solvent-free urethane-modified diphenylmethane diisocyanate), and Rubinate 1780 (a product of ICI identified as polymeric methylene diphenyl diisocyanate).

The concentration of the polyisocyanate (D) in the inventive composition is, in one embodiment, about 0.1% to about 20% by weight based on the total weight of the inventive composition. In one embodiment, the concentration of (D) is about 0.5% to about 10%, and in one embodiment about 0.5% to about 5%, and in one embodiment about 1% to about 3% by weight based on the total weight of the inventive composition.

The inventive compositions are characterized by a mole ratio of NCO groups from component (D) to OH groups from component (C) in the range of about 0.1 to about 10, and in one embodiment about 0.5 to about 8, and in one embodiment about 1 to about 5, and in one embodiment about 1.3 to about 2.8, and in one embodiment about 1 to about 2.5, and in one embodiment about 1.2 to about 2.2.

The polymerization initiator (E) is a free radical initiator capable of generating free radicals that can initiate cross-linking between the monomer (B) containing the terminal ethylene groups and the unsaturated prepolymer resin (A) but does not cause any significant cross-linking at low temperatures. In other words, the polymerization initiators must be such that they are sufficiently stable at the temperatures at which the inventive compositions are formed so that they do not prematurely cross-link and become thermoset. In one embodiment, the polymerization initiators are chosen from materials which contain either a peroxide group or an azo group. Examples of useful peroxide compounds include t-butyl perbenzoate, t-butyl peroctoate, benzoyl peroxide, t-butyl hydroperoxide, succinic acid peroxide, cumene hydroperoxide and dibenzoyl peroxide. Examples of useful azo compounds include azobisisobutyronitrile and t-butylazoisobutyronitrile. An example of a commercially available initiator that can be used is Vazo 64, which is a product of DuPont identified as azobisisobutyronitrile. Generally, the concentration of initiator (E) in the inventive composition is from about 0.1% to about 5% by weight, and in one embodiment about 0.2% to about 1% by weight, based on the total weight of the inventive composition.

In one embodiment, the inventive composition is in the form of a paste and it is desirable to increase the paste viscosity without the application of external heat. In such cases where there is a hydroxyl/isocyanate reaction, metal compounds, especially organo tin compounds, are useful catalysts for the hydroxyl/isocyanate reaction. This allows the reaction to proceed at a sufficient rate to increase the paste viscosity at a desired rate. Examples of such organo tin compounds include dibutyl tin dilaurate, dibutyl tin (IV) diacetate and dibutyl tin (IV) oxide. An example of a commercially available organo tin compound that can be used is Fastcat 4202, which is a product of M&T Chemicals identified as dibutyl tin dilaurate. The metal compounds are typically employed in the inventive composition at concentrations in the range of up to about 1% by weight, and in one embodiment about 0.01% to about 0.2% by weight.

In order to avoid premature polymerization of the polymerizable materials used with the inventive compositions, a small amount of a polymerization inhibitor can be used. Examples of such inhibitors include hydroquinone, tertiary butyl catechol, methyl ether of hydroquinone, and the like. These inhibitors should be incorporated in the reaction mixture prior to reaction. An example of a commercially available inhibitor that can be used is SP-91029, which is a product of Plasticolors identified as a mixture of 2,6-di-tert-butyl-p-cresol (25%) and vinyl toluene (75%). These inhibitors can be employed in the inventive compositions at concentrations up to about 1% by weight, and in one embodiment about 0.01% to about 0.2% by weight.

Other ingredients which may be dispersed into the inventive compositions include one or more of the following: fillers, fibrous reinforcing materials, pigments, mold release agents, thermoplastic and elastomeric polymeric materials, shrink control agents, wetting agents, antifoam agents and thickeners.

Fillers are added to the inventive compositions as extenders to impart such properties as reduction in shrinkage and tendency to crack during curing. Fillers also tend to improve stiffness and heat resistance in molded articles. Examples of fillers that can be utilized include alumina trihydrate, calcium carbonate, clays, calcium silicate, silica, talcs, mica, barytes, dolomite, solid or hollow glass spheres of various densities. A commercially available filler that can be used is Camel-Wite, which is a product of Genstar Stone Products Co. identified as limestone dust.

The particular filler chosen may be dependent upon the cost of such filler, the effect of the filler on mix viscosity and flow properties, or the effect that the filler has on properties such as shrinkage, surface smoothness, chemical resistance, flammability and/or the electrical characteristics of the cured molded article. The amounts of filler included in the inventive compositions may vary up to about 70% by weight, and in one embodiment from about 10% to about 50% by weight. The amount preferred for any particular formulation can be determined readily by one skilled in the art. Useful fillers generally will have an average particle size of from about 0.3 to about 50 microns, and in one embodiment about 1 to about 12 microns.

Fibrous reinforcing materials can be added to the inventive compositions for the purpose of imparting strength and other desirable physical properties to the cured products formed therefrom. Examples of fibrous reinforcements that can be utilized include glass fibers, asbestos, synthetic organic fibers such as acrylonitrile, nylon, polyamide, polyvinyl alcohol and polyester fibers, and natural organic fibers such as cotton and sisal. Useful fibrous reinforcements include glass fibers which are available in a variety of forms including, for example, mats of chopped or continuous strands of glass, glass fabrics, chopped glass and chopped glass strands.

The amount of fibrous reinforcing material included in the inventive compositions can be varied over a wide range including amounts of up to about 75% by weight, although much smaller amounts will be required if any of the above-described fillers are included in the formulation. The amount of fibrous reinforcing material can vary from about 10% to about 40% by weight, and in one embodiment from about 15% to about 25% by weight. The amount of fibrous reinforcing material to be utilized in any particular formulation can be determined readily by one skilled in the art.

Mold release agents also can be included and these are typically zinc, calcium, magnesium or lithium salts of fatty acids. Specific examples of mold release agents include zinc stearate, calcium stearate, magnesium stearate, lithium stearate, calcium oleate, zinc palmitate, etc. A commercially available mold release agent that can be used is Synpro Zinc Stearate Type ABG, which is a product of Synthetic Products Co. identified as zinc stearate. Another is Calcium Stearate Densified S-951, which is a product of Huls America, Inc, identified as calcium stearate. Calcium stearate may also be obtained under the trade designation COAD® 10B available from Norac Company. These mold release agents can be included in the inventive compositions at concentrations of up to about 5% by weight, and in one embodiment from about 1% to about 5% by weight.

Pigments also can be included in the inventive compositions. Typical examples of pigments include carbon blacks, iron oxides, titanium dioxide and phthalocyanines. The pigment can be dispersed into the inventive compositions as dry pigment powders or pre-dispersed forms in non-reactive carriers.

Thermoplastic or elastomeric polymeric materials which reduce the shrinkage of the inventive compositions during molding can also be included. These thermoplastic and elastomeric materials can be used to produce molded articles having surfaces of improved smoothness. Examples of useful thermoplastic and elastomeric polymers include homopolymers of ethylene, styrene, vinyl toluene, alkyl methacrylates and alkyl acrylates. Additional examples of thermoplastic and elastomeric polymers are copolymers of: vinyl chloride and vinyl acetate; styrene and acrylonitrile; methyl methacrylate and alkyl esters of acrylic acid; methyl methacrylate and styrene; methyl methacrylate and acrylamide; and SBS block copolymers. Up to about 15% by weight of a thermoplastic or elastomeric polymer can be included in the inventive compositions.

Shrink control agents are added to the inventive compositions to impart such properties as reduction in shrinkage to the resultant products.

R-134 made by Premix, Inc., which is a solution of an unsaturated polyester resin/styrene monomer (70–75% by weight) and SEP (25–30% by weight) (styrene ethylene propylene diblock) is one example of a shrink control agent. Shrink control agents are added to the inventive compositions in the range from about 1% to about 20% by weight, and preferably from about 5% to about 15% by weight.

Wetting agents are added to the inventive compositions to impart one or more properties such as faster incorporation of particulates during compounding, shorter dispersing times, viscosity modification, and improved flow behavior. Anionic wetting agents are preferred. A general example of a wetting agent includes a solution of a saturated polyester with acidic groups. A specific representative example includes BYK®-W 996 available from BYK-Chemie USA. Wetting agents are added to the inventive compositions in the range from about 0.01% to about 5% by weight, and preferably from about 0.1% to about 2% by weight. In one embodiment, the wetting agent is added to the inventive composition either with the initial blending of the unsaturated prepolymer resin (A), unsaturated polymerizable material (B), hydroxy-terminated polyester (C), and polymerization initiator (E) or when the polyisocyanate (D) is added to the initial blend. In another embodiment, the wetting agent is added to the inventive composition in two doses; namely, with the initial blending of the unsaturated prepolymer resin (A), unsaturated polymerizable material (B), hydroxy-terminated polyester (C), and polymerization initiator (E), and with the polyisocyanate (D).

Antifoam agents are added to the inventive compositions to reduce the tendency to foam. Non-aqueous antifoam agents are preferred. Silicone based compounds are also preferred. Specific examples include AF70 and AF9000 available from GE Silicones. Antifoam agents are added to the inventive compositions in the range from about 0.0001% to about 0.1% by weight, and preferably from about 0.001% to about 0.01% by weight.

Thickeners are added to the inventive compositions to increase the viscosity of a thickenable molding compound in a controlled manner. Suitable thickeners include a reactive metal hydroxide in an organic resin. An example is magnesium hydroxide in an unsaturated, monomer free polyester resin. This compound is available from Plasticolors, Inc. under the designation PLASTIGEL®PG-91146. Thickeners are added to the inventive compositions in the range from about 0.01% to about 2% by weight, and preferably from about 0.1% to about 1% by weight. In one embodiment, the thickener is added to the inventive composition either with the initial blending of the unsaturated prepolymer resin (A), unsaturated polymerizable material (B), hydroxy-terminated polyester (C), and polymerization initiator (E) or when the polyisocyanate (D) is added to the initial blend. In another embodiment, the thickener is added to the inventive composition in two doses; namely, with the initial blending of the unsaturated prepolymer resin (A), unsaturated polymerizable material (B), hydroxy-terminated polyester (C), and polymerization initiator (E), and with the polyisocyanate (D).

In one embodiment, the inventive compositions are made by first preparing a composition comprising all of the ingredients for the inventive composition, but for the fibrous reinforcing materials and the polyisocyanate (D). This composition, which is typically in the form of a paste-like material, is prepared by first blending together the unsaturated prepolymer resin (A), unsaturated polymerizable material (B), hydroxy-terminated polyester (C), polymerization initiator (E) and any accelerators, inhibitors, mold release agents, pigments or thermoplastic or elastomeric polymeric materials that may be desired, using a high shear mixer. Any filler material that is to be used is then added, and the high shear mixing is continued until an adequate dispersion of all of the filler and other materials is achieved. The polyisocyanate (D) is then added and the mixture is mixed to form the paste-like composition.

In another embodiment, the inventive compositions are made by first preparing a composition comprising all of the ingredients for the inventive composition, but for the fibrous reinforcing materials, the polyisocyanate (D), thickeners, and a second portion of the mold release agents. This composition, which is typically in the form of a paste-like material, is prepared by first blending together the unsaturated prepolymer resin (A), unsaturated polymerizable material (B), hydroxy-terminated polyester (C), polymerization initiator (E) and any accelerators, inhibitors, a first portion of the mold release agents, pigments or thermoplastic or elastomeric polymeric materials that may be desired, using a high shear mixer. Any filler material that is to be used is then added, and the high shear mixing is continued until an adequate dispersion of all of the filler and other materials is achieved. Then the second portion of the wetting agent is added and blended. The polyisocyanate (D), the second portion of the mold release agents and the thickeners are then added and the mixture is mixed to form the paste-like composition.

High shear mixers that can be used include Banbury mixers, cowels disperser, two roll mills, high shear compound screw extruders and similar mixers. Generally, this type of mixing results in a significant increase in the temperature of the material being mixed, and this temperature must be maintained below the critical temperatures which would result in decomposition of the polymerization initiators which would cause premature polymerization of the inventive compositions.

In one embodiment, the inventive compositions are characterized by a zero shear apparent viscosity (ZSAV) in the range of about 100,000 to about 10,000,000 poise, and in one embodiment from about 100,000 to about 8,000,000 poise, and in one embodiment about 100,000 to about 2,500,000 poise. In yet another embodiment, the ZSAV is in the range of about 200,000 to about 9,000,000 poise, and in another embodiment from about 500,000 to about 7,000,000 poise.

In one embodiment, the inventive compositions are characterized by maximum stress values in the range of about 0.1 to about 8 MPa, and in one embodiment from about 0.1 to about 5 MPa, and in one embodiment from about 0.7 to 2 MPa, and in one embodiment from about 0.5 to 1.5 MPa. These maximum stress values can be measured using a Premix Processability Tester, model PPT 1000, which is discussed in greater detail below.

In one embodiment, the inventive compositions are characterized by a maximum hydrodynamic coefficient of friction ($K_H$) above about 1.05E+04 Pa.sec/mm ($1.05 \times 10^4$ Pa.sec/mm). In another embodiment, the inventive compositions are characterized by a hydrodynamic coefficient of friction ($K_H$) from about 4.4E+02 to about 1.05E+04 Pa.sec/mm, and preferably from about 1E+03 to 1E+04 Pa.sec/mm. The hydrodynamic coefficient of friction ($K_H$) may be obtained from the stress values discussed in the preceding paragraph.

The inventive sheet molding compounds are made using, for example, an SMC machine of the type illustrated in FIG. 1. Referring to FIG. 1, the inventive sheet molding paste-like composition ("paste") is fed to the two doctor boxes. A carrier film, which can be, for example, polypropylene, is advanced past each doctor box on a conveyor belt, and a layer of paste is deposited on each carrier film. Chopped strand fiber strand (e.g., fiberglass) is deposited onto one layer of paste, and the other layer of paste is placed over the first layer to form a composite structure comprising the two carrier films on the outside and the paste and chopped fiber strand sandwiched in between. The composite structure is advanced through a compactor comprising a series of reduction rollers to form the inventive sheet molding compound which, in one embodiment, is in the form of a compact flat reinforced resin sheet.

The inventive sheet molding compounds are suitable for use in low pressure sheet molding operations. These molding operations are conducted at pressures below about 100 psi, and typically in the range of about 60 to about 95 psi. The temperature used in these molding operations is generally in the range of about 80° C. to about 100° C., and in one embodiment about 85° C. to about 95° C. These molding operations are conducted using conventional molding techniques, but for the low pressures. Carrier film is peeled off the inventive sheet molding compounds, and the sheets are laid in the mold. The mold is closed, the desired temperature and pressure are applied, the sheet molding compound flows within the mold and cures, and the desired molded article is formed and removed. Examples of molded articles that can be formed using the inventive sheet molding compounds include: sanitary ware such as bathtubs, shower surrounds, sinks, and the like; automotive parts such as outer door panels, truck front ends, and the like; residential housing accessories such as entrance doors; sports and recreational items such as water craft; electrical parts and business equipment parts such as housings, and the like.

The following examples illustrate the preparation of the inventive sheet molding compounds. Unless otherwise indicated, in the following examples as well as throughout the entire specification and in the appended claims, all parts and percentages are by weight, and all temperatures are in degrees Celsius.

EXAMPLES A–D

The following Examples A–D are provided to illustrate the inventive sheet molding compounds. These compounds are prepared using the components listed in the following Table I. These compounds are prepared by first adding components (1) to (6) to a vessel in the order listed, then blending the resulting mixture with a high shear mixer for one minute. Component (7) is then added and the resulting paste is mixed while the temperature increases to 90° F. (32.2° C.). Components (8) and (9) are then added, and the mixture is mixed for two minutes to form a paste-like composition.

Equal parts of the paste-like composition ("paste") are fed into the two doctor boxes of an SMC machine of the type illustrated in FIG. 1. The SMC machine is operated at a rate of 7.58 meters/min. A polyethylene carrier film is advanced past each doctor box on a conveyor belt, and a layer of paste is deposited on each carrier film. The chopped strand fiber glass is deposited onto one layer of paste, and the other layer of paste is placed over the first layer to form a composite structure. The composite structure passes through reduction rollers forming a compact flat reinforced resin sheet containing 24% by weight glass and having an average thickness of 4 millimeters. The sheet molding compound/polyethylene film sandwich is rolled and stored.

TABLE I

|  |  | A | B | C | D |
|---|---|---|---|---|---|
| (1) | Unsaturated Polyester/Styrene monomer mixture supplied by Reichold Under Product Code 7568-44-3 | 41.78 | 41.78 | 41.78 | 42.01 |
| (2)(a) | Desmophen 1700 | 4.18 | — | — | — |
| (2)(b) | Desmophen 1652 | — | 4.18 | — | — |
| (2)(c) | Desmophen R-12A | — | — | 4.18 | — |
| (2)(d) | Desmophen 1800 | — | — | — | 4.20 |
| (3) | Vazo 64 | 0.62 | 0.62 | 0.62 | 0.63 |
| (4) | Fastcat 4202 | 0.08 | 0.08 | 0.08 | 0.08 |
| (5) | SP-91029 | 0.16 | 0.16 | 0.16 | 0.16 |
| (6) | Synpro Zinc Stearate Type ABG | 2.09 | 2.09 | 2.09 | 2.10 |
| (7) | Camel-Wite | 25.01 | 25.01 | 25.09 | 25.14 |
| (8) | Lupranate MP102 | 1.04 | 1.04 | 1.04 | 0.84 |
| (9) | Rubinate 1780 | 1.04 | 1.04 | 1.04 | 0.84 |
| (10) | Chopped strand fiberglass, 1" | 24.00 | 24.00 | 24.00 | 24.00 |
|  | NCO/OH mole ratio | 1.93 | 1.83 | 1.66 | 1.47 |

To demonstrate the molding capability of the sheet molding compounds of Examples A–D, four 7.5-inch squares from each example are cut from the rolled samples. Each of these samples is soft to the touch, but not tacky. The polyethylene film is removed from each side. The squares are stacked on top of each other and placed at the center of an 12-inch square mold. The total weight of the four 7.5×7.5 inch squares is 550 grams. The four 7.5×7.5 inch squares are compressed at 60 psi pressure for 5 minutes at 200° F. (93.3° C.). The resulting fully cured 12×12 inch laminates have the mechanical properties indicated in the following Table II.

TABLE II

|  | A | B | C | D |
|---|---|---|---|---|
| Tensile Strength, psi (ASTM D638) | 10,926 | 18,361 | 14,546 | 15,363 |
| Flexural Strength, psi (ASTM D790) | 26,920 | 36,242 | 28,584 | 32,693 |
| Flexural Modulus, x $10^6$ psi (ASTM D790) | 1.28 | 1.47 | 1.28 | 1.40 |
| Notched Izod, ft-lb/in (ASTM D256) | 11.21 | 13.47 | 12.84 | 12.60 |
| Unnotched Izod, ft-lb/in (ASTM D4812) | 20.94 | 22.15 | 15.07 | 20.39 |
| Tensile Modulus, x $10^6$ psi (ASTM D638) | 1.56 | 1.84 | 1.56 | 1.60 |

TABLE II-continued

|  | A | B | C | D |
|---|---|---|---|---|
| Zero Shear Apparent Viscosity, poise | 7,963,000 | 128,000 | 1,928,000 | 580,000 |
| Maximum Stress, MPa | 3.706 | 0.771 | 1.125 | 1.050 |

In order to test the squeeze flow characteristics of the sheet molding compounds of Examples A–D, 3.5-inch square samples from each example are cut from the rolled samples and evaluated using a Premix Processability Tester, model PPT 1000. This apparatus is a rheological instrument designed for testing sheet molding compound samples in a compression molding geometry at compression molding shear rates. The basic components of the apparatus include a load cell, a one piece cross head, hydraulic pump unit, heated platens, hardware controller and a personal computer. The tests consist of monitoring the stress as the sample is squeezed between the two platens. The load cell is located above the stationary upper platen while the lower platen moves toward it at a controlled constant velocity to a predetermined percent strain. At that point the piston is instantaneously stopped and held at a constant displacement while stress relaxation occurs. The raw data is separated into two parts representing stress build and stress relaxation. There are three regions or stages of interest in the stress build part. The first stage, where stress build is slow, is due to compaction of the material. The second stage, where stress rises quickly, is due to transient material deformation. The third stage, which follows a yield, is the steady state flow region from which viscosities can be calculated.

Figure 2:
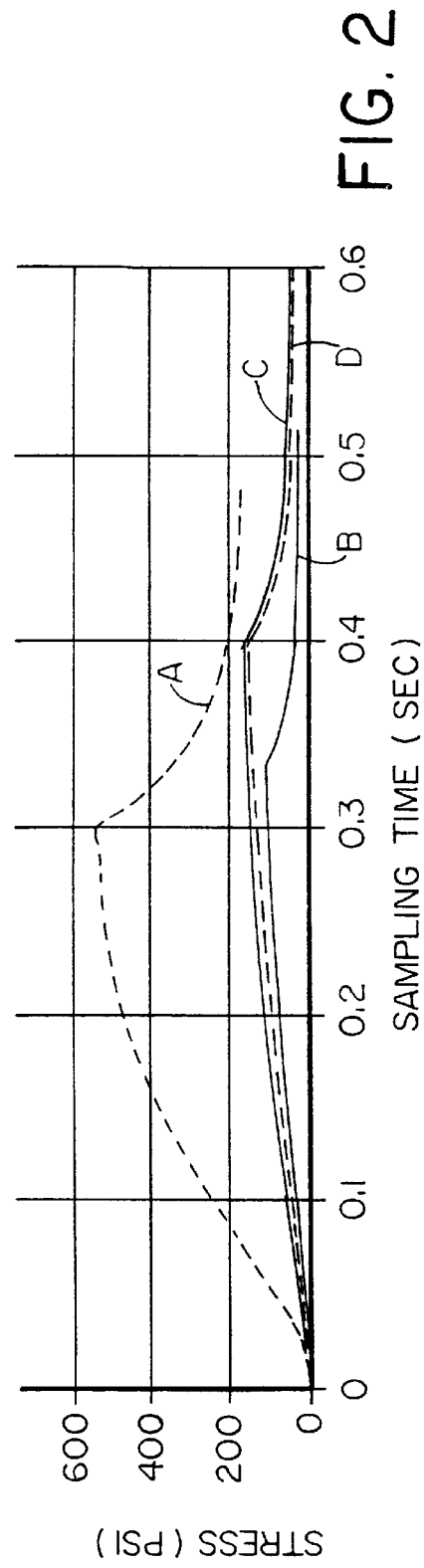
FIG. 2 is a plot of stress curves for sheet molding compounds made according to Examples A–D.

The samples from Examples A–D are tested using the PPT 1000 tester by heating the platens to 200° F. (93.3° C.). The controller and computer are turned on and the following test parameters are set:

(a) closure speed: 5 mm/sec.
(b) 40% compression
(c) 0% precompression
(d) 100 KN full scale
(e) 0.2 second hold time after initial compression
(f) 2 minute cure Two plies of the 3.5-inch squares are placed between the platens, and the tests are conducted to produce the stress curves plotted in FIG. 2.

EXAMPLES E–G

The following Examples E–G are provided to further illustrate the inventive sheet molding compounds. These compounds are prepared using the components listed in the following Table III. These compounds are prepared by first adding components (1) to (9) to a vessel in the order listed, then blending the resulting mixture with a high shear mixer for one minute. Component (10) is then added and the resulting paste is mixed while the temperature increases to 100° F. (37.8° C.). Components (11) to (14) are then added, and the mixture is mixed for two minutes to form a paste-like composition.

Equal parts of the paste-like composition ("paste") are fed into the two doctor boxes of an SMC machine of the type illustrated in FIG. 1. The SMC machine is operated at a rate of 7.58 meters/min. A polyethylene carrier film is advanced past each doctor box on a conveyor belt, and a layer of paste is deposited on each carrier film. The chopped strand fiber glass, component (15) is deposited onto one layer of paste, and the other layer of paste is placed over the first layer to form a composite structure. The composite structure passes through reduction rollers forming a compact flat reinforced resin sheet containing 24% by weight glass and having an average thickness of 4 millimeters. The sheet molding compound/polyethylene film sandwich is rolled and stored.

TABLE III

| | | E | F | G |
|---|---|---|---|---|
| (1)(a) | Unsaturated Polyester/Styrene monomer mixture supplied by Reichold Under Product Code 7568-44-3 | — | 6.84 | 6.84 |
| (1)(b) | Styrene monomer and Polyester resin mixture supplied by Owens-Corning Fiberglas Corp. Under Product Code E-903 | 13.68 | 6.84 | — |
| (1)(c) | Unsaturated Polyester/Styrene monomer mixture supplied by Reichold Under Product Code 31615-20 | — | — | 6.84 |
| (2) | Desmophen 1700 | 1.21 | 1.21 | 1.21 |
| (3) | Vazo 64 | 0.2 | 0.2 | 0.2 |
| (4) | Fastcat 4202 | 0.03 | 0.03 | 0.03 |
| (5) | SP-91029 | 0.12 | 0.12 | 0.12 |
| (6) | Synpro Zinc Stearate Type ABG | 1.6 | 1.6 | 1.6 |
| (7) | Unsaturated Polyester/Styrene monomer and SEP mixture supplied by Premix, Inc. Under Product Code R-134 | 10.3 | 10.3 | 10.3 |
| (8) | Saturated polyester with acidic groups supplied by BYK Chemie Under Product Code BYK-996 | 0.25 | 0.25 | 0.25 |
| (9) | Dimethyl Silicone Antifoam Compound supplied by GE Silicones Under Product Code AF9000 | 0.003 | 0.003 | 0.003 |
| (10) | Camel-Wite | 47.01 | 46.18 | 47.61 |
| (11) | Lupranate MP102 | 0.8 | 1.0 | 0.2 |
| (12) | Saturated polyester with acidic groups supplied by BYK Chemie Under Product Code BYK-996 | 0.4 | 0.4 | 0.4 |
| (13) | Chemical Dispersion supplied by Plasticolors Under Product Code PG-91146 | 0.3 | 0.3 | 0.3 |
| (14) | Calcium Stearate Densified S-951 Supplied by Huls America | 0.1 | 0.1 | 0.1 |
| (15) | Chopped strand fiberglass, 1/2" | 24.0 | 24.0 | 24.0 |
| | NCO/OH mole ratio | 7.77 | 4.59 | 0.92 |

To demonstrate the molding capability of the sheet molding compounds of Examples E–G, three 7.5-inch squares from each example are cut from the rolled samples. Each of these samples is soft to the touch, but not tacky. The polyethylene film is removed from each side. The squares are stacked on top of each other and placed at the center of an 12-inch square mold. The total weight of the four 7.5×7.5 inch squares is 550 grams. The four 7.5×7.5 inch squares are compressed at 60 psi pressure for 5 minutes at 200° F. (93.3° C.). The resulting fully cured 12×12 inch laminates have the mechanical properties indicated in the following Table IV.

TABLE IV

| | E | F | G |
|---|---|---|---|
| Tensile Strength, psi (ASTM D638) | 4,899 | 5,138 | 4,834 |
| Flexural Strength, psi (ASTM D790) | 13,374 | 14,407 | 13,252 |
| Flexural Modulus, x $10^6$ psi (ASTM D790) | 1.17 | 1.35 | 1.21 |
| Notched Izod, ft-lb/in (ASTM D256) | 10.17 | 11.18 | 9.10 |

TABLE IV-continued

| | E | F | G |
|---|---|---|---|
| Unnotched Izod, ft-lb/in (ASTM D4812) | 12.06 | 13.80 | 12.85 |
| Tensile Modulus, x $10^6$ psi (ASTM D638) | 1.11 | 1.26 | 1.18 |
| Zero Shear Apparent Viscosity, poise | 5,371,555 | 8,918,668 | 6,267,582 |
| Maximum Stress, MPa | 1.807 | 2.036 | 1.108 |

Figure 3:
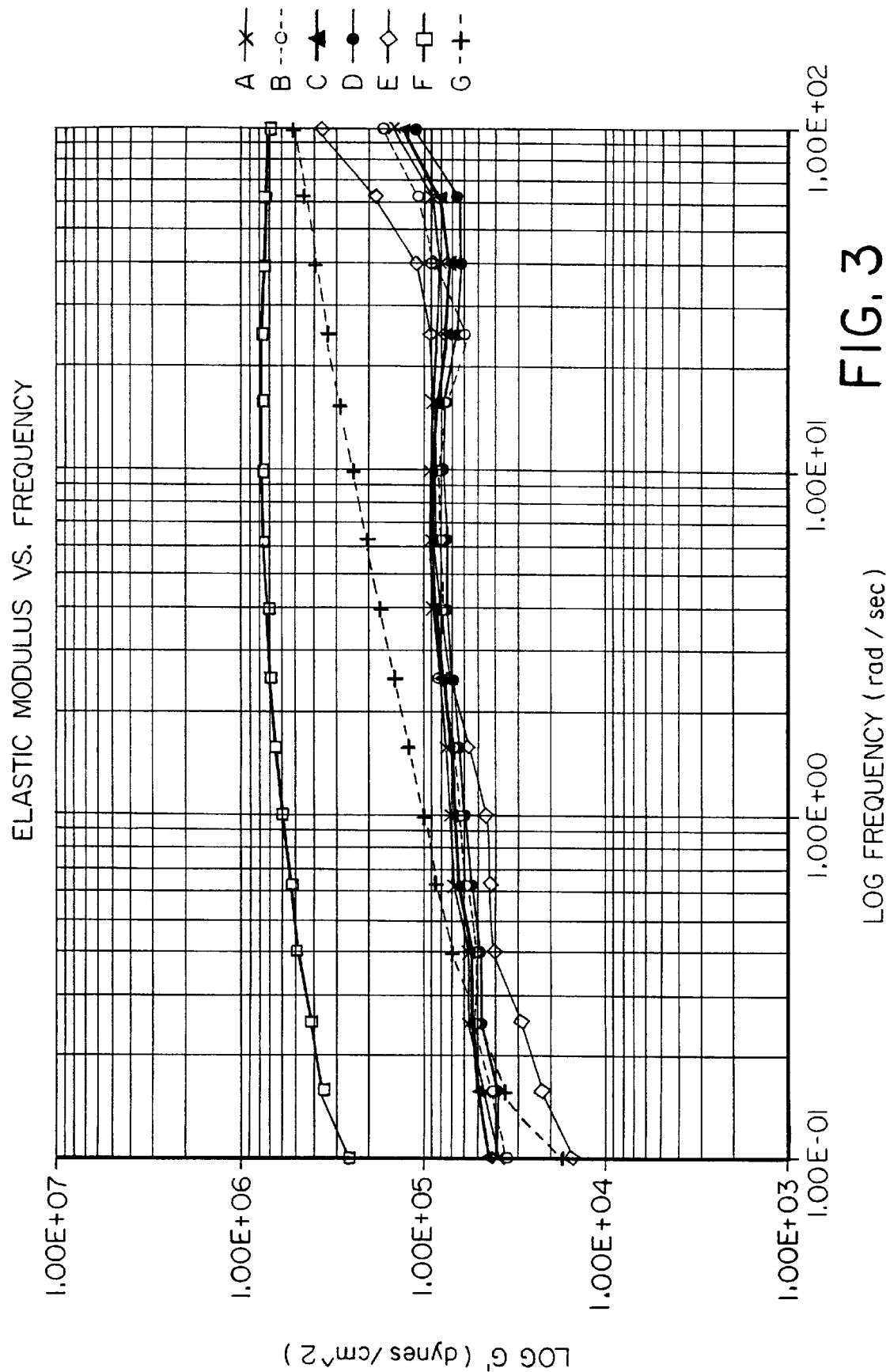
FIG. 3 is a plot of the logarithm of elastic modulus (G') versus the logarithm of frequency of Examples A–G.

Various characteristics of the sheet molding compounds of Examples A–G are examined. The following data is obtained using a torsional dynamic mechanical analyzer from AIC Systems model 2000 research rheometer using 40 mm parallel plates and run at ambient temperature. Frequency sweeps are run on all materials between 0.1 to 100 radians per second. Specifically, storage or elastic modulus is reported in FIG. 3. In FIG. 3, the logarithm of elastic modulus (G') versus the logarithm of frequency (rad/sec) is plotted. As can be seen from FIG. 3, at 0.1 rad/sec, G' had a range of about 1.47E+04 to about 2.57E+05 dynes/cm$^2$, and at 100 rad/sec, G' had a range of about 1.14E+05 to about 6.99E+05 dynes/cm$^2$. Elastic modulus is a component of the shear modulus which is in phase with the strain. Elastic modulus generally corresponds to the elasticity of a material.

Figure 4:
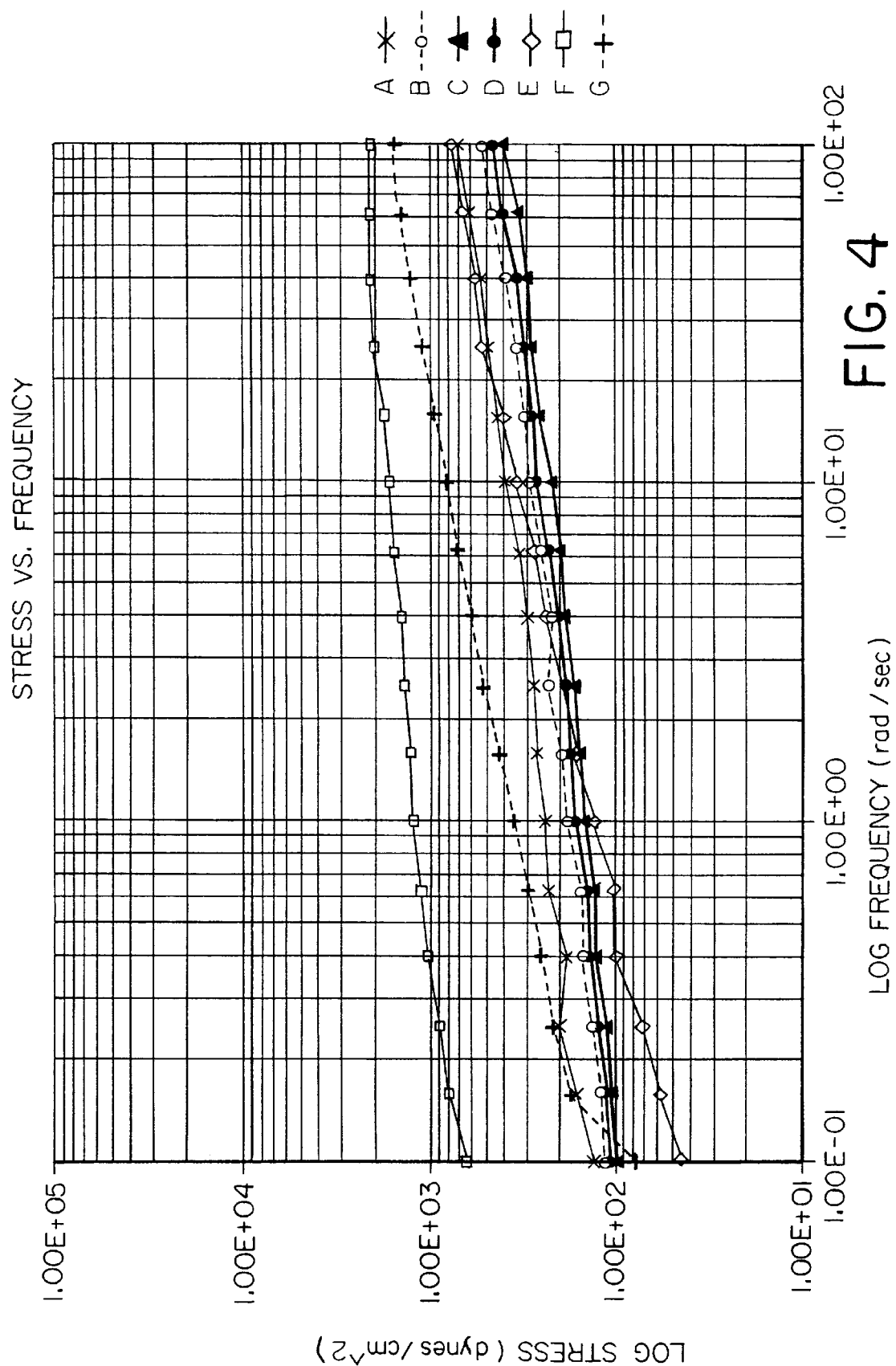
FIG. 4 is a plot of the logarithm of stress (dynes/cm$^2$) versus the logarithm of frequency of Examples A–G.

Referring to FIG. 4, the logarithm of stress (dynes/cm$^2$) versus the logarithm of frequency (rad/sec) is plotted. Stress is the force per unit area which is needed to deform a material. As can be seen from FIG. 4, at about 0.1 rad/sec, the stress range is about 4.45E+01 to about 6.32E+02 dynes/cm$^2$ and at about 100 rad/sec, the stress range is about 1.55E+03 to about 2.08E+03 dynes/cm$^2$.

Figure 5:
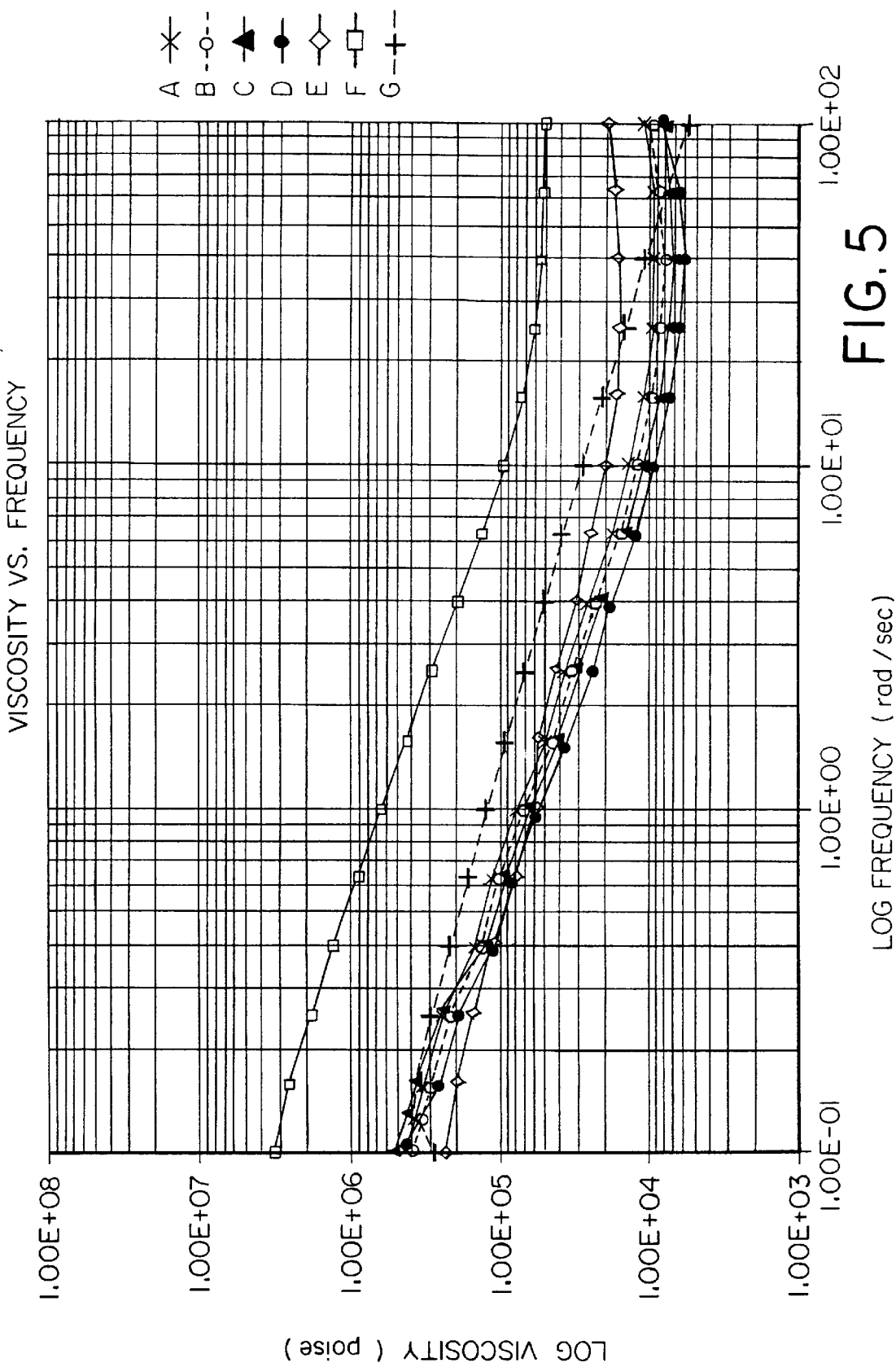
FIG. 5 is a plot of the logarithm of viscosity (poise) versus the logarithm of frequency of Examples A–G.

Referring to FIG. 5, the logarithm of viscosity (poise) versus the logarithm of frequency (rad/sec) is plotted. The viscosity of a material is a measurement of its resistance to flow. Viscosity is also a measure of a material's ability to dissipate energy. In FIG. 5, at about 0.1 rad/sec, the viscosity range is about 2.40E+05 to about 3.23E+06 poise, and at about 100 rad/sec, the viscosity range is about 5.73E+03 to about 5.10E+04 poise.

Figure 6:
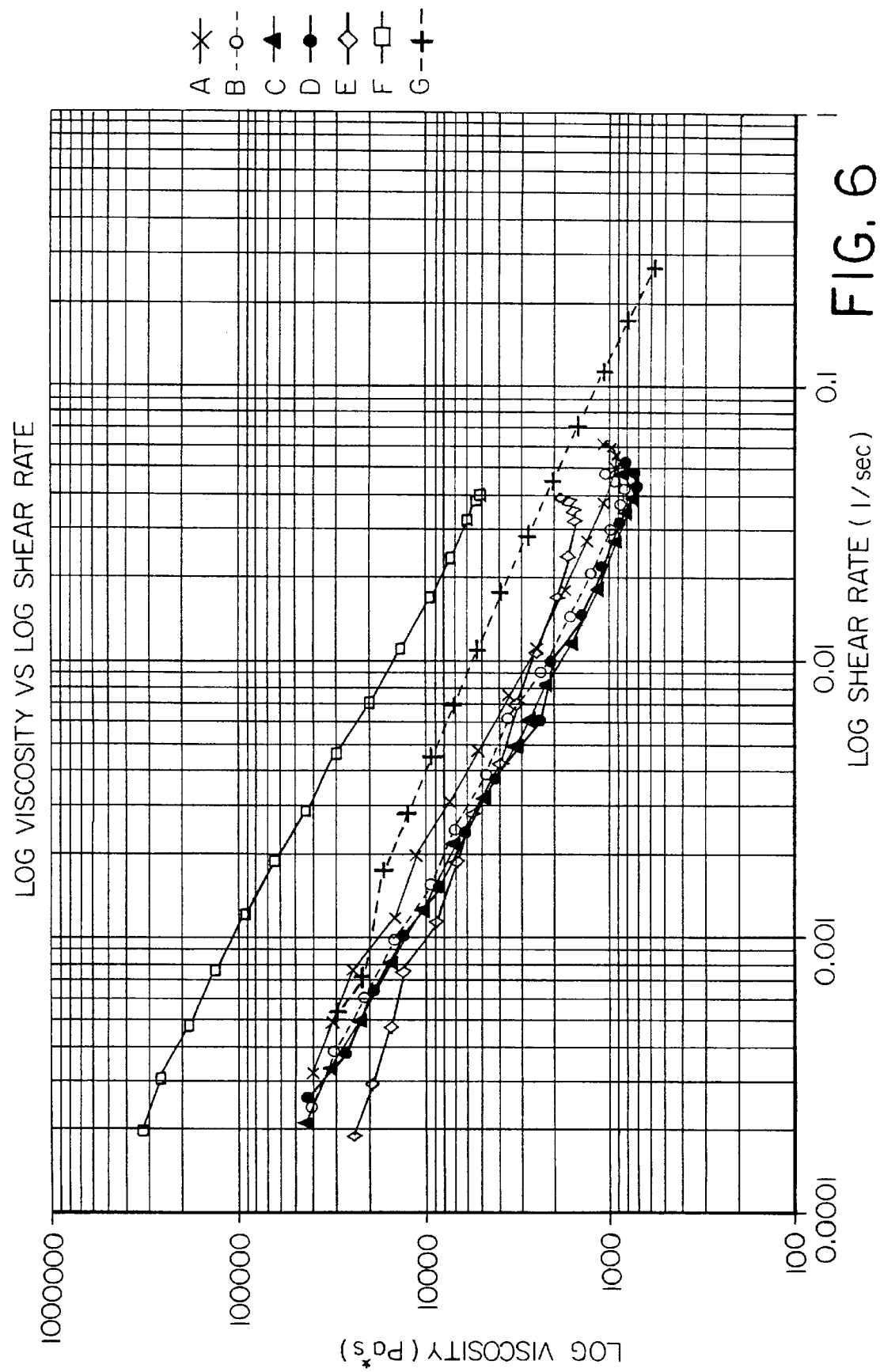
FIG. 6 is a plot of the logarithm of viscosity (Pa.sec) versus the logarithm of shear rate of Examples A–G.

Referring to FIG. 6, the logarithm of viscosity (Pa.sec) versus the logarithm of shear rate (1/sec) is plotted. As can be seen from FIG. 6, the shear rates range from about 1.5E-04 to about 3.0E-01 1/sec and viscosities range from 573 to about 322,700 Pa.sec.

Figure 7:
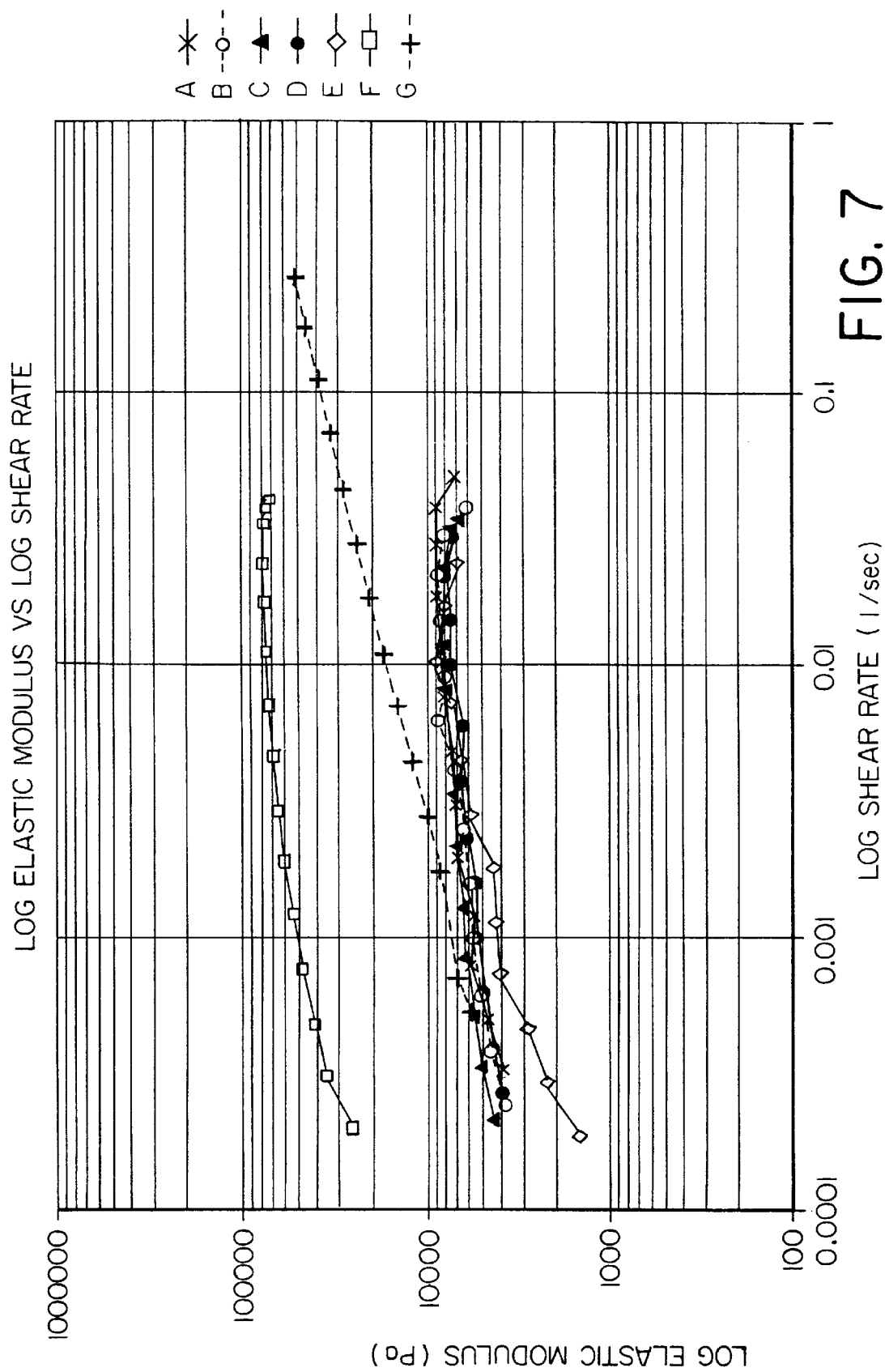
FIG. 7 is a plot of the logarithm of elastic modulus (Pa) versus the logarithm of shear rate of Examples A–G.

Referring to FIG. 7, the logarithm of elastic modulus (Pa) versus the logarithm of shear rate (1/sec) is plotted. As can be seen from FIG. 7, the shear rates range from about 1.5E-04 to about 3.0E-01 1/sec and the elastic modulus ranges from about 36,790 to about 69,930 Pa.

Figure 8:
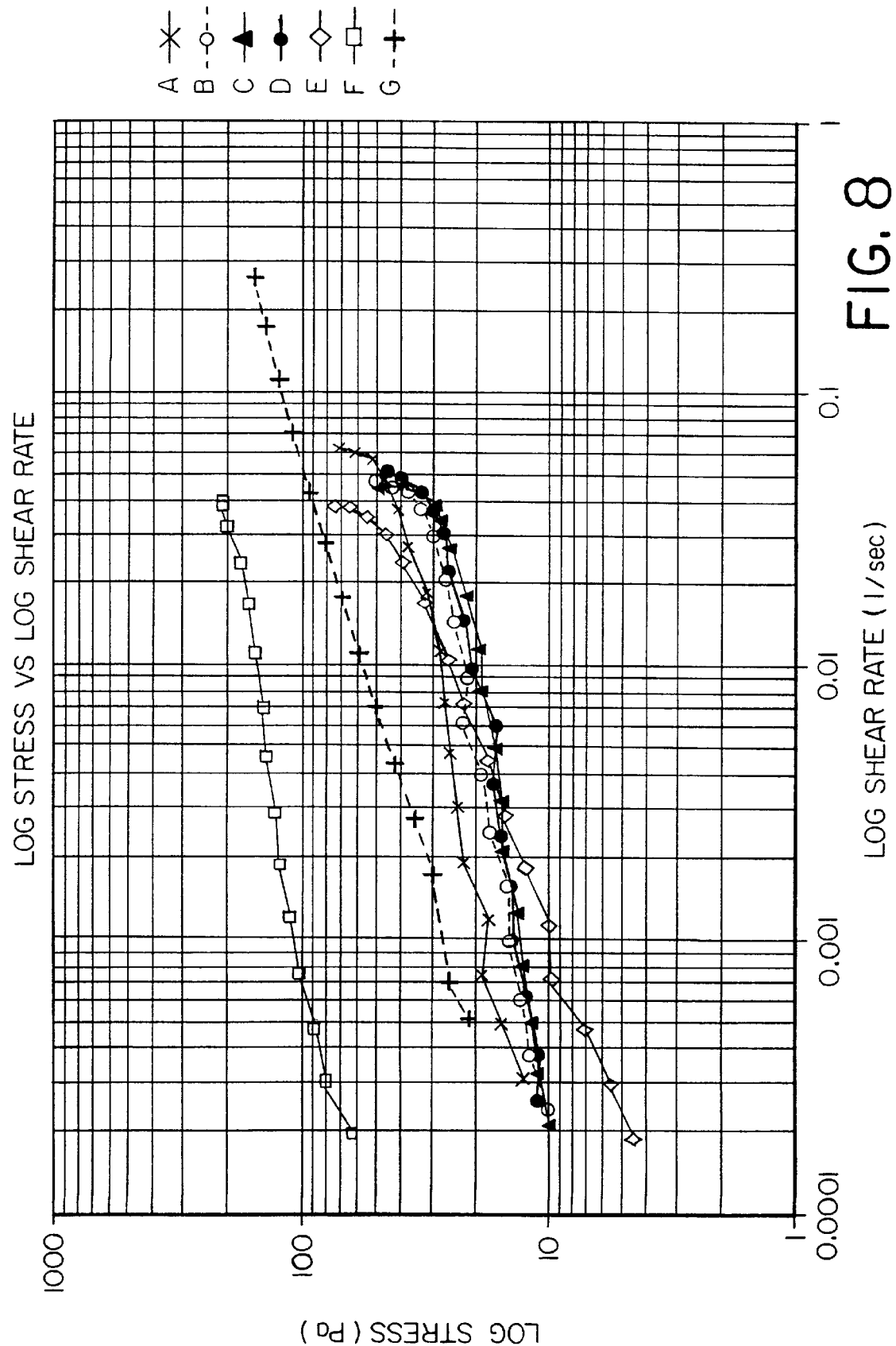
FIG. 8 is a plot of the logarithm of stress (Pa) versus the logarithm of shear rate of Examples A–G.

Referring to FIG. 8, the logarithm of stress (Pa) versus the logarithm of shear rate (1/sec) is plotted. As can be seen from FIG. 8, the shear rates range from about 1.5E-04 to about 3.0E-01 1/sec and the stress values range from about 73.8 to about 208.0 Pa.

Figure 9:
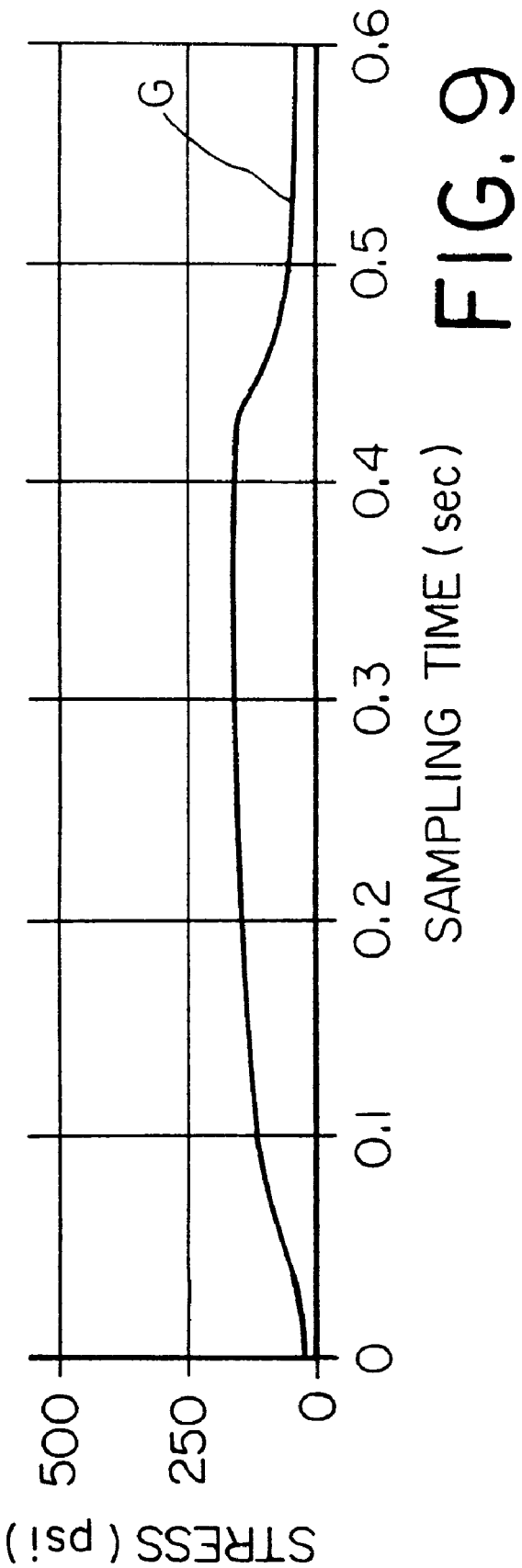
FIG. 9 is a plot of a stress curve for a sheet molding compound made according to Example G.

The sample from Example G is tested using the PPT 1000 tester by heating the platens to 200° F. (93.3° C.). The controller and computer are turned on and the following test parameters are set:

(a) closure speed: 5 mm/sec.
(b) 40% compression
(c) 0% precompression
(d) 100 KN full scale (e) 0.2 second hold time after initial compression (f) 2 minute cure Two plies of the 3.5-inch squares are placed between the platens, and the tests are conducted to produce the stress curve plotted in FIG. 9.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition that is moldable at pressures below about 100 psi, said composition being made by combining:
   (A) an unsaturated prepolymer resin, wherein the unsaturated prepolymer resin is an unsaturated polyester resin or a vinyl ester resin;
   (B) a monomeric unsaturated polymerizable material containing a terminal ethylene group;
   (C) a hydroxy-terminated polyester having a molecular weight in the range of about 500 to about 3000;
   (D) a polyisocyanate; and
   (E) a polymerization initiator containing an azo group; said composition being characterized by a mole ratio of NCO groups from (D) to OH groups from (C) in the range of about 0.1 to about 10.

2. The composition of claim 1 wherein said composition further comprises a polymerization accelerator.

3. The composition of claim 1 wherein said composition further comprises a polymerization inhibitor.

4. The composition of claim 1 wherein said composition further comprises at least one of a mold release agent and a filler.

5. The composition of claim 1 wherein said composition further comprises at least one of a thermoplastic polymeric material, an elastomeric polymeric material, a shrink control agent, a wetting agent, an antifoam agent and a thickener.

6. The composition of claim 1 wherein said composition further comprises a fibrous reinforcing material.

7. The composition of claim 1 wherein (A) is an unsaturated polyester resin.

8. The composition of claim 1 wherein (A) is the reaction product of dibasic acid or anhydride with a dihydroxy or trihydroxy compound; said dibasic acid or anhydride being selected from the group consisting of maleic acid or anhydride, fumaric acid, itaconic acid, tetrahydrophthalic anhydride, adipic acid, succinic acid, phthalic acid, isophthalic acid, terephthalic acid and tetrachlorophthalic acid or anhydride; said dihydroxy and trihydroxy compounds being selected from the group consisting of ethylene glycol, propylene glycol, 1,2-butanediol, 1,3-butanediol, 1,4-butanediol, diethylene glycol, dipropylene glycol, glycerol and neopentyl glycol.

9. The composition of claim 1 wherein (A) is the reaction product of a dibasic acid or anhydride with the reaction product of an alkylene oxide with 2,2'-bis(4-hydroxyphenylene)propane.

10. The composition of claim 1 wherein (A) is a vinyl ester resin.

11. The composition of claim 1 wherein (B) is selected from the group consisting of styrene, alpha-methyl styrene, chlorostyrene, vinyl toluene, divinyl benzene, dialkylphthalate, methyl methacrylate, and mixtures of two or more thereof.

12. The composition of claim 1 wherein (C) is a hydroxy terminated polyester having a molecular weight in the range of about 500 to about 3000 and a functionality of 2 to about 4 hydroxyl groups per molecule.

13. The composition of claim 1 wherein (D) is selected from the group consisting of 2,4-toluene diisocyanate; 2,6-toluene diisocyanate; m-phenylene diisocyanate; p-phenylene diisocyanate; 1,5-naphthalene diisocyanate; 4,4'-diphenyl ether diisocyanate; 4,4',4"-triphenylmethane triisocyanate; 2,4,4'-triisocyanatodiphenylmethane; 2,2',4-triisocyanato diphenyl; 4,4'-diphenylmethane diisocyanate; 4,4'-benzophenone diisocyanate; 2,2-bis(4-isocyanatophenyl)propane; 1,4-naphthalene diisocyanate; 4-methoxy-1,3-phenylene diisocyanate; 4-chloro-1,3-phenylenediisocyanate; 4-bromo-1,3-phenylene diisocyanate; 4-ethoxy-1,3-phenylene diisocyanate; 2,4'-diisocyanatodiphenyl ether; 4,4'-diisocyanatodiphenyl; 9,10-anthracene diisocyanate; 4,6-dimethyl-1,3-phenylene diisocyanate; 4,4'-diisocyanatodibenzyl; 3,3'-dimethyl-4,4'-diisocyanatodiphenylmethane; 3,3'-dimethyl-4,4'-diisocyanatodiphenyl; 3,3'-dimethoxy-4,4'-diisocyanatodiphenyl; 1,8-naphthalene diisocyanate; 2,4,6-toluene triisocyanate; 2,4,4'-triisocyanatodiphenyl ether; diphenylmethane diisocyanate available under the trademarks Mondur and Papi, having a functionality of 2.1 to 2.7; 1,3-xylene 4,6-diisocyanate; aromatic isocyanate-terminated polyurethanes; aromatic isocyanate-terminated prepolymers of polyesters; 1,6-hexamethylene diisocyanate; ethylene diisocyanate; propylene 1,2-diisocyanate; butylene 1,2-diisocyanate; butylene 2,3-diisocyanate; pentamethylene diisocyanate; cyclopentylene 1,3-diisocyanate; cyclohexylene 1,2-diisocyanate; cyclohexylene 1,3-diisocyanate; cyclohexylene 1,4-diisocyanate; 1,10-decamethylene diisocyanate; diisocyanato dicyclohexyl methane; 1,5-diisocyanato-2,2-dimethyl pentane; hydrogenated 4,4'-diphenylmethane diisocyanate; hydrogenated toluene diisocyanate; $(OCNCH_2CH_2)_2S$; $(OCNCH_2CH_2CH_2)_2O$; $OCNCH_2CH_2CH_2CH(OCH_3)CH_2CH_2NCO$; $OCNCH_2CH_2CH_2O(CH_2)_4OCH_2CH_2CH_2NCO$;

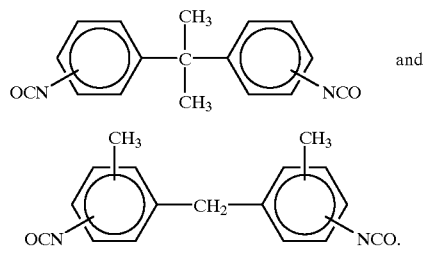

14. The composition of claim 1 wherein (D) comprises:
   (D-1) urethane modified diphenylmethane diisocyanate; and
   (D-2) polymeric methylene diphenyl diisocyanate.

15. The composition of claim 1 wherein (E) is selected from the group consisting of azobisisobutyronitrile and t-butylazoisobutyronitrile.

16. The composition of claim 1 wherein said composition further comprises an organo tin compound.

17. The composition of claim 1 wherein said composition further comprises a compound selected from the group consisting of 2,6-di-tert-butyl-p-cresol, hydroquinone, tertiary butyl catechol and methyl ether of hydroquinone.

18. A composition that is moldable at pressures below about 100 psi, said composition being made by combining: an unsaturated polyester resin having an acid number in the range of zero to about 5; styrene monomer; a hydroxy terminated polyester having a molecular weight in the range of about 500 to about 3000; urethane modified diphenylmethane diisocyanate; polymeric methylene diphenyl diisocyanate; azobisisobutyronitrile; dibutyl tin dilaurate; 2,6-di-tert-butyl-p-cresol; zinc stearate; calcium carbonate; and fiberglass; said composition being characterized by a mole ratio of NCO groups from said diisocyanate to OH groups from said hydroxy terminated polyester in the range of about 0.1 to about 10.

19. A method of molding comprising the step of:

molding a composition at pressures below about 100 psi, said composition made by combining:

(A) an unsaturated prepolymer resin, wherein the unsaturated prepolymer resin is an unsaturated polyester resin or a vinyl ester resin;

(B) a monomeric unsaturated polymerizable material containing a terminal ethylene group;

(C) a hydroxy-terminated polyester having a molecular weight in the range of about 500 to about 3000;

(D) a polyisocyanate; and (E) a polymerization initiator containing an azo group; said composition being characterized by a mole ratio of NCO groups from (D) to OH groups from (C) in the range of about 0.1 to about 10.

* * * * *